United States Patent
Fukasawa

(10) Patent No.: US 8,542,393 B1
(45) Date of Patent: Sep. 24, 2013

(54) PRINT CONTROL APPARATUS, IMAGE FORMING SYSTEM, AND NON-TRANSITORY COMPUTER-READABLE MEDIUM

(71) Applicant: Fuji Xerox Co., Ltd., Tokyo (JP)

(72) Inventor: Hajime Fukasawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/735,459

(22) Filed: Jan. 7, 2013

(30) Foreign Application Priority Data

Mar. 27, 2012 (JP) .................................. 2010-071341

(51) Int. Cl.
G06F 3/12 (2006.01)

(52) U.S. Cl.
USPC .......................... 358/1.15; 358/1.13; 358/1.14

(58) Field of Classification Search
USPC ............. 358/1.13, 1.14, 1.15, 1.16; 709/202, 709/203, 218, 224; 710/16, 18, 19; 718/101
See application file for complete search history.

(56) References Cited

U.S. PATENT DOCUMENTS

2002/0027565 A1 3/2002 Syukri
2006/0001898 A1 1/2006 Maeshima et al.

FOREIGN PATENT DOCUMENTS

| JP | A-03-181989 | 8/1991 |
| JP | A-07-175617 | 7/1995 |
| JP | A-2002-082664 | 3/2002 |
| JP | A-2006-015625 | 1/2006 |

*Primary Examiner* — Vu B Hang

(74) *Attorney, Agent, or Firm* — Oliff & Berridge, PLC

(57) ABSTRACT

A print control apparatus includes an accepting unit, a generating unit, a transmission unit, a display, a determination unit, and a display controller. The accepting unit accepts a print request. The generating unit generates, on the basis of the print request, print data for outputting an image onto printing paper. The transmission unit transmits the print data to a printing apparatus. The display displays a display screen of a list of print requests accepted by the accepting unit, together with process states of the print requests. The determination unit determines whether a progress speed with which processes based on the print requests are to be completed is not lower than a value. When the progress speed is lower than the set value, the display controller updates the display screen at first time intervals, and, otherwise, updates the display screen at second time intervals longer than the first time intervals.

6 Claims, 11 Drawing Sheets

UPDATE DISPLAY SCREEN EVERY SEVERAL SECONDS

PRINT CONTROL APPARATUS, IMAGE FORMING SYSTEM, AND NON-TRANSITORY COMPUTER-READABLE MEDIUM

CROSS-REFERENCE TO RELATED APPLICATIONS

This application is based on and claims priority under 35 USC 119 from Japanese Patent Application No. 2012-071341 filed Mar. 27, 2012.

BACKGROUND

Technical Field

The present invention relates to a print control apparatus, an image forming system, and a non-transitory computer-readable medium.

SUMMARY

According to an aspect of the invention, there is provided a print control apparatus including an accepting unit, a generating unit, a transmission unit, a display, a determination unit, and a display controller. The accepting unit accepts a print request. The generating unit generates, on the basis of a print request accepted by the accepting unit, print data for outputting an image onto printing paper. The transmission unit transmits print data generated by the generating unit to a printing apparatus. The display displays a display screen of a list of multiple print requests accepted by the accepting unit, together with process states of the individual print requests. The determination unit determines whether or not a progress speed that is a speed with which processes based on the multiple print requests are to be completed is equal to or higher than a set value. When it is determined by the determination unit that the progress speed is lower than the set value, the display controller performs control of updating the display screen of the list of the print requests, which is displayed on the display, at first time intervals. When it is determined by the determination unit that the progress speed is equal to or higher than the set value, the display controller performs control of updating the display screen of the list of the print requests, which is displayed on the display, at second time intervals which are longer than the first time intervals.

BRIEF DESCRIPTION OF THE DRAWINGS

An exemplary embodiment of the present invention will be described in detail based on the following figures, wherein.

DETAILED DESCRIPTION

Next, an exemplary embodiment of the present invention will be described in detail with reference to the drawings.

Figure 1:
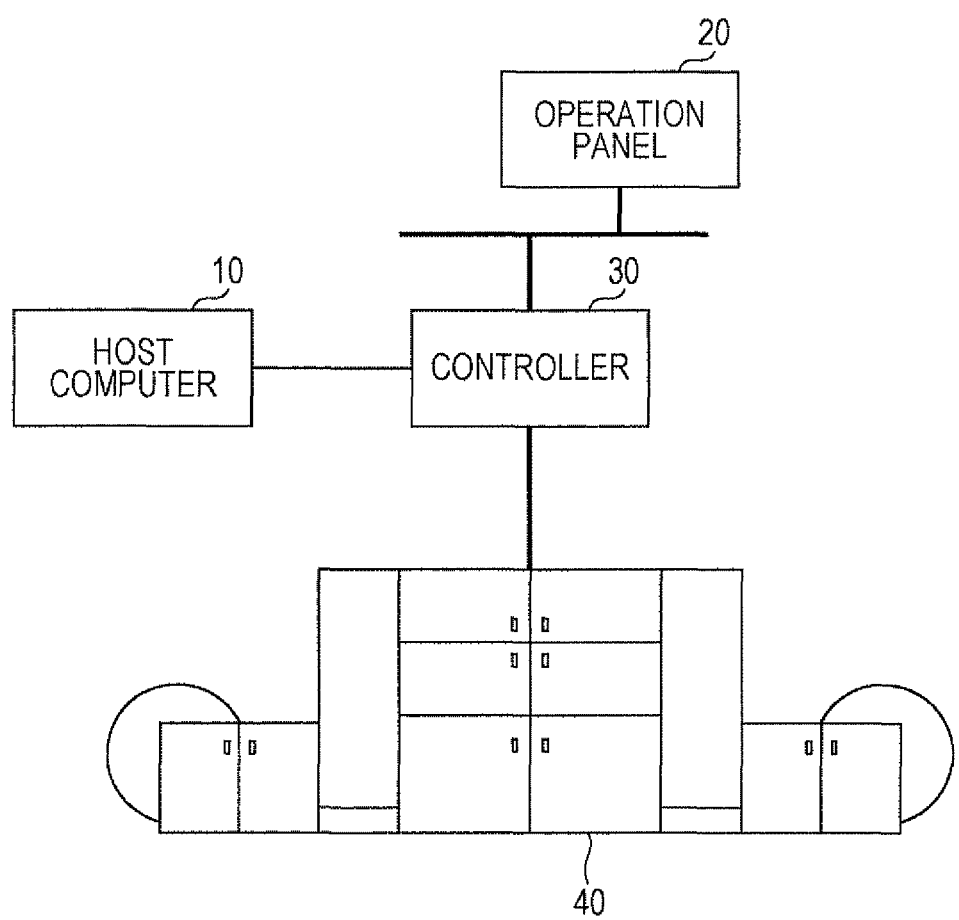
FIG. 1 is a diagram illustrating a system configuration of a printing system according to an exemplary embodiment of the present invention.

FIG. 1 is a block diagram illustrating a configuration of a printing system according to an exemplary embodiment of the present invention.

As illustrated in FIG. 1, the printing system according to the exemplary embodiment of the present invention includes a host computer 10 that generates and outputs print jobs, an operation panel 20, a controller (a print control apparatus) 30, and a printing apparatus 40 that performs print processes on continuous-form paper. Note that, although it is described in the present exemplary embodiment that the operation panel 20 and the controller 30 are independently configured, the operation panel 20 may be included as a component in the controller 30.

Figure 2:
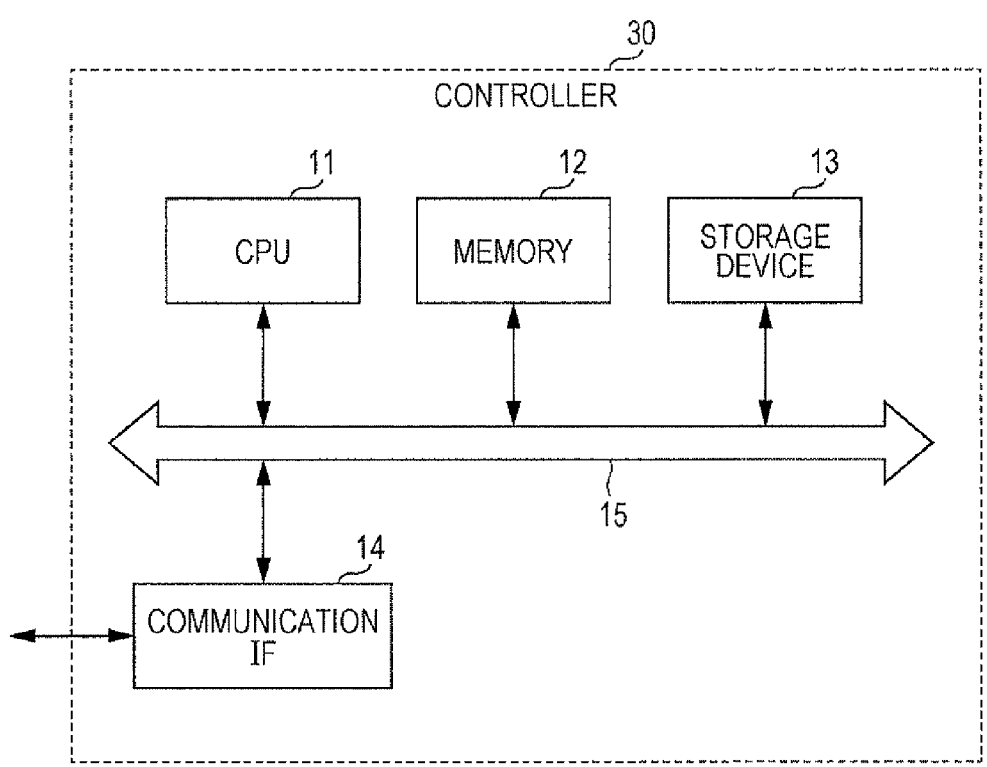
FIG. 2 is a block diagram illustrating a hardware configuration of a controller in the exemplary embodiment of the present invention.

Next, a hardware configuration of the controller 30 in the printing system according to the present exemplary embodiment is illustrated in FIG. 2.

As illustrated in FIG. 2, the controller 30 includes a control processing unit (CPU) 11, a memory 12, a storage device 13 such as a hard disk drive (HDD), and a communication interface (IF) 14 that performs transmission and reception of data between an external apparatus or the like and the controller 30 via a network. These components are connected to each other via a control bus 15.

The CPU 11 performs a predetermined process in accordance with a control program that is stored in the memory 12 or the storage device 13, thereby controlling an operation of the controller 30. Note that, although it is descried in the present exemplary embodiment that the CPU 11 reads and executes the control program stored in the memory 12 or the storage device 13, the control program may be stored on a storage medium such as a compact disc read only memory (CD-ROM), and may be supplied to the CPU 11.

Figure 3:
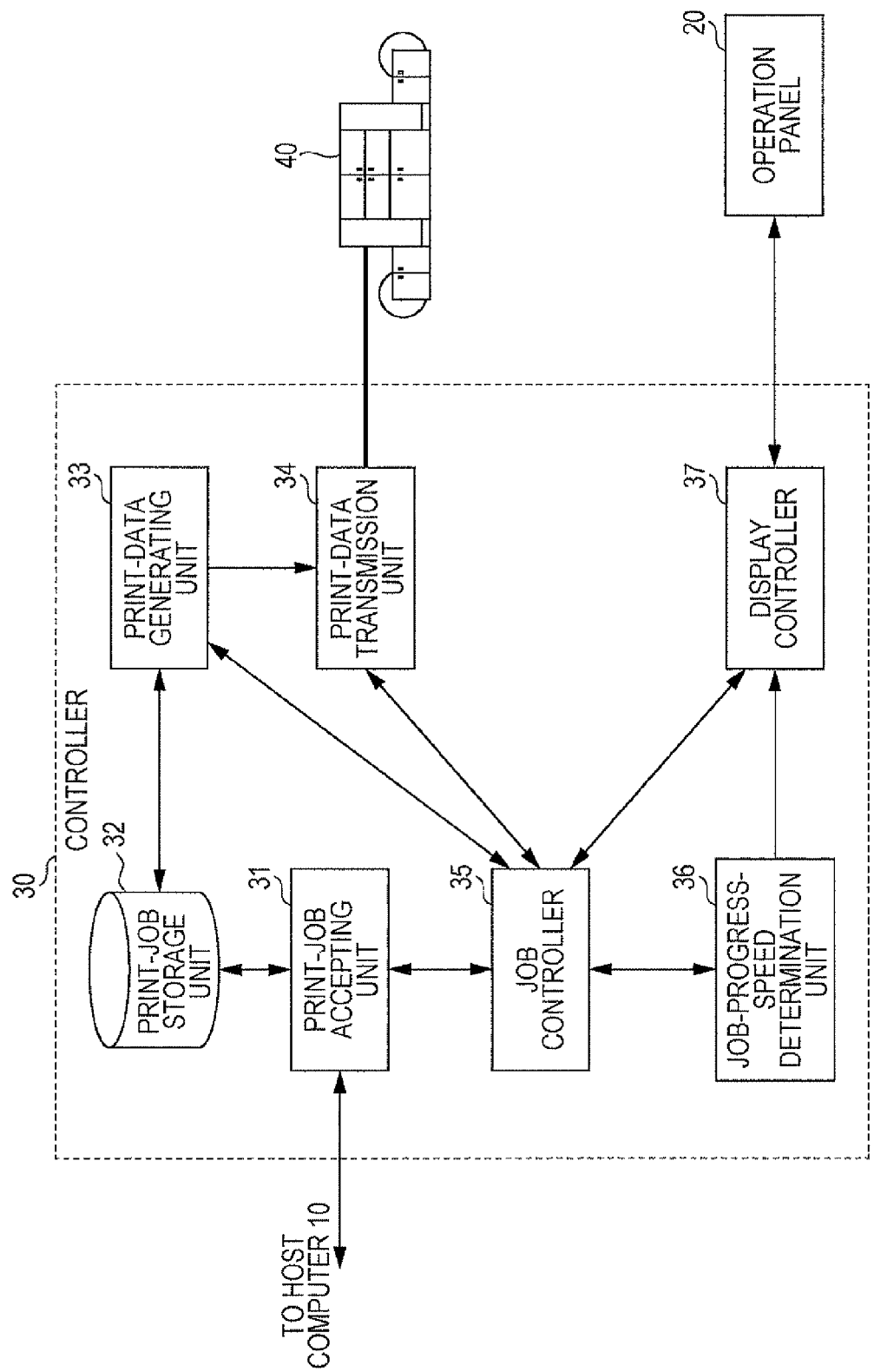
FIG. 3 is a block diagram illustrating a functional configuration of the controller in the exemplary embodiment of the present invention.

FIG. 3 is a block diagram illustrating a functional configuration of the controller 30 that is realized by executing the control program.

As illustrated in FIG. 3, the controller 30 in the present exemplary embodiment includes a print-job accepting unit 31, a print-job storage unit 32, a print-data generating unit 33, a print-data transmission unit 34, a job controller 35, a job-progress-speed determination unit 36, and a display controller 37.

The print-job accepting unit 31 sequentially accepts print jobs (print requests) that have been transmitted from the host computer 10.

The print-job storage unit 32 stores the print jobs accepted by the print-job accepting unit 31.

The print-data generating unit 33 generates print data for outputting images on printing paper, on the basis of the print jobs that have been accepted by the print-job accepting unit 31 and that have been stored by the print-job storage unit 32. More specifically, the print-data generating unit 33 generates, as print data, image data in a raster format on the basis of the print jobs accepted by the print-job accepting unit 31.

The print-data transmission unit 34 transmits the print data, which has been generated by the print-data generating unit 33, to the printing apparatus 40. Then, the printing apparatus 40 outputs, on printing paper, images based on the print data transmitted by the print-data transmission unit 34.

The job controller 35 controls processes for print jobs that are being processed in the print-job accepting unit 31, the print-data generating unit 33, and the print-data transmission unit 34, and monitors the progress states of the print jobs.

The display controller 37 performs control of displaying, on the operation panel 20, a display screen of a list of the multiple print jobs accepted by the print-job accepting unit 31, together with the process states of the individual print jobs.

Figure 4:
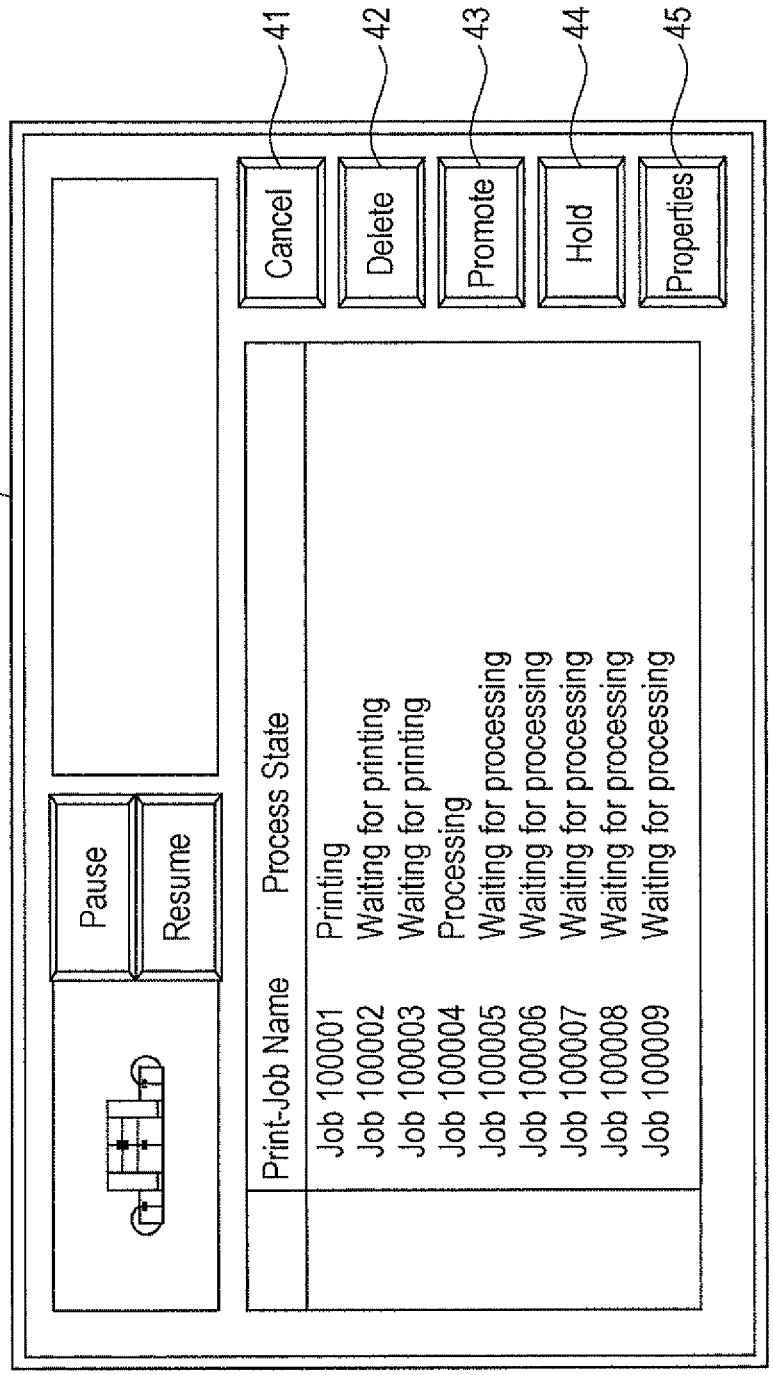
FIG. 4 is a diagram illustrating an example of a display screen, which is displayed on an operation panel, of a list of print jobs.

An example of the display screen of the list of print jobs displayed on the operation panel 20 is illustrated in FIG. 4. In the display screen of the list of print jobs illustrated in FIG. 4, the print-job names of print jobs and the process states of the print jobs are displayed as a list. For example, it is indicated that the process state of a print job whose job name is "job 100001" is a "Printing" state. Furthermore, on the operation panel 20, various types of operation buttons 41 to 45 that are used to, for example, cancel or delete a print job are displayed.

Here, the term "Printing" implies that a print process based on generated print data is being performed in the printing apparatus 40, i.e., a state in which "printing is being performed". Furthermore, the term "Waiting for printing" implies that print data has been generated, and implies a state of waiting for a print process to be performed in the printing apparatus 40. Moreover, the term "Processing" implies a state in which print data is being generated in the print-data generating unit 33 on the basis of an accepted print job. Finally, the term "Waiting for processing" implies a state in which print data is to be generated in the print-data generating unit 33, i.e., a state in which a print job is stored in the print-job storage unit 32.

The job-progress-speed determination unit 36 receives information concerning the progress states of individual print jobs from the job controller 35, and determines whether or not a progress speed that is a speed with which print processes based on the individual print jobs are to be completed is equal to or higher than a set value. For example, when the number of print jobs for which print processes were completed within sixty seconds is equal to or larger than fifteen, the job-progress-speed determination unit 36 determines that the progress speed is equal to or higher than the set value and is a high speed. When the number of print jobs for which print processes were completed within sixty seconds is equal to or smaller than fourteen, the job-progress-speed determination unit 36 determines that the progress speed is equal to or lower than the set value and is a low speed.

When it is determined by the job-progress-speed determination unit 36 that the progress speed is equal to or higher than the set value, the display controller 37 performs control of updating the display screen of the list of print jobs displayed on the operation panel 20, which is a display unit, at set time intervals (a polling mode). Here, it is considered that the time intervals at which the contents displayed in the display screen of the list of print jobs are updated are time intervals at which a user can visually recognize the contents displayed in the display screen of the list of print jobs, and may be, for example, about several seconds.

Furthermore, when it is determined by the job-progress-speed determination unit 36 that the progress speed is lower than the set value, the display controller 37 performs control of immediately updating the display screen of the list of print jobs displayed on the operation panel 20 when the process state of any one of the print jobs changes (a real-time mode).

In other words, when the printing apparatus that performs print processes is a high-speed apparatus, display of the display screen of the list of print jobs is preformed in the polling mode, and, when the printing apparatus is a low-speed apparatus, display of the display screen of the list of print jobs is preformed in the real-time mode.

Moreover, when the display controller 37 performs control of updating the display screen of the list of print jobs displayed on the operation panel 20 at the set time intervals (when the display controller 37 performs display of the display screen of the list of print jobs in the polling mode), the display controller 37 may perform control of not displaying print jobs whose process states are each the "Printing" state in the display screen of the list of print jobs.

Additionally, when the display controller 37 performs control of updating the display screen of the list of print jobs displayed on the operation panel 20 at the set time intervals (when the display controller 37 performs display of the display screen of the list of print jobs in the polling mode), the display controller 37 may perform control of displaying the process states of the print jobs in such a manner that the process states of all of the print jobs in the display screen of the list of print jobs are each assumed to be a "Printing completed" state. The reason for this is that, in the case where high-speed printing is being performed, it is a highly probable that printing processes for the print jobs which are being displayed are already completed at a time at which the user looks at the list of print jobs.

Next, an operation performed in the controller 30 in the present exemplary embodiment will be described in detail with reference to FIG. 5.

Figure 5:
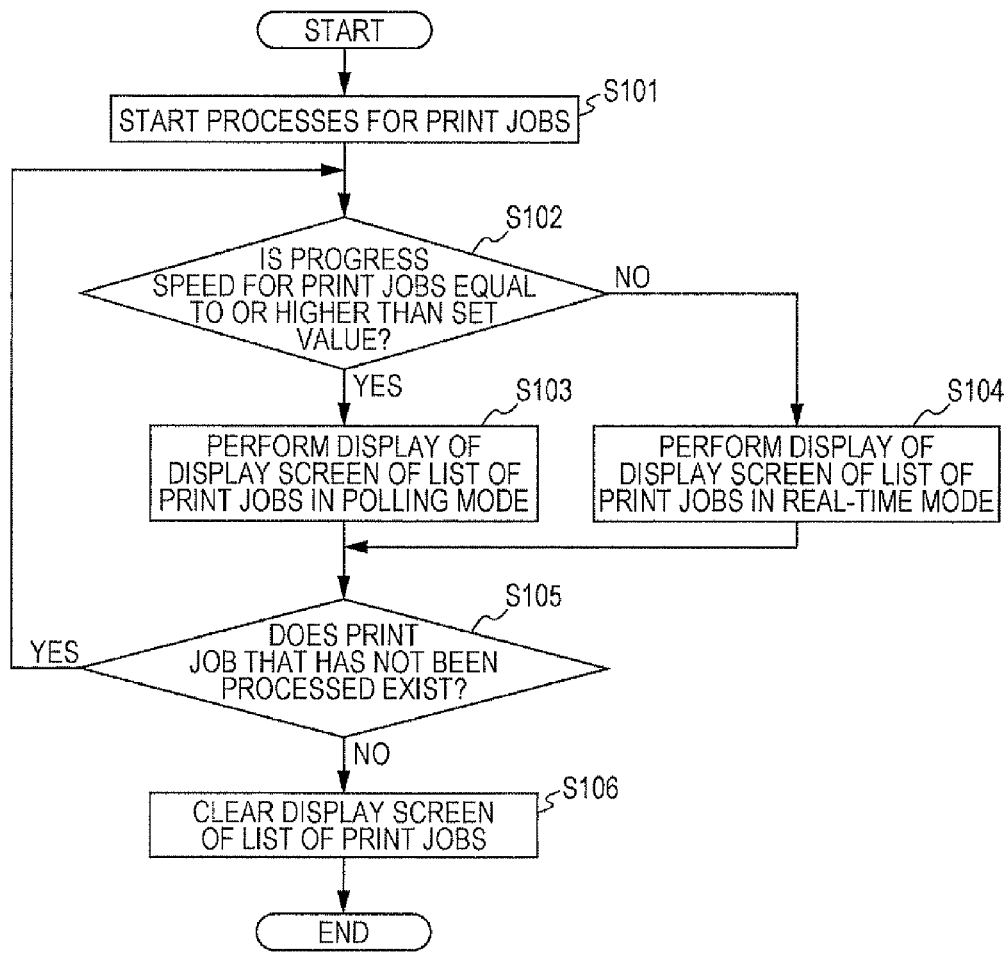
FIG. 5 is a flowchart illustrating an operation in the case where a display controller in the exemplary embodiment of the present invention performs display of the display screen of the list of print jobs.

FIG. 5 is a flowchart illustrating an operation in the case where the display controller 37 in the present exemplary embodiment performs display of the display screen of the list of print jobs.

First, when print jobs are transmitted from the host computer 10 and received by the print-job accepting unit 31, the job controller 35 controls the print-data generating unit 33 and so forth so as to start processes for the received print jobs (step S101).

Then, the job-progress-speed determination unit 36 receives information concerning the progress states of the individual print jobs from the job controller 35, and determines whether or not the progress speed, which is a speed with which the processes based on the print jobs are to be completed, is equal to or higher than the set value (step S102).

When it is determined in step S102 that the progress speed is equal to or higher than the set value (YES in step S102), the display controller 37 performs display of the display screen of the list of print jobs in the polling mode in which the contents displayed in the display screen are updated at the set time intervals (step S103).

Furthermore, when it is determined in step S102 that the progress speed is lower than the set value (NO in step S102), the display controller 37 performs display of the display screen of the list of print jobs in the real-time mode in which the contents displayed in the display screen are immediately updated when the process state of any one of the process jobs changes (step S104).

Then, when a print job that has not been processed exists, the processes of steps S102 to S104 are repeatedly performed (step S105). Then, when processes for all of the print jobs have finished (NO in step S105), the display controller 37 clears the display screen of the list of the print jobs, and finishes the process (step S106).

Figure 6:
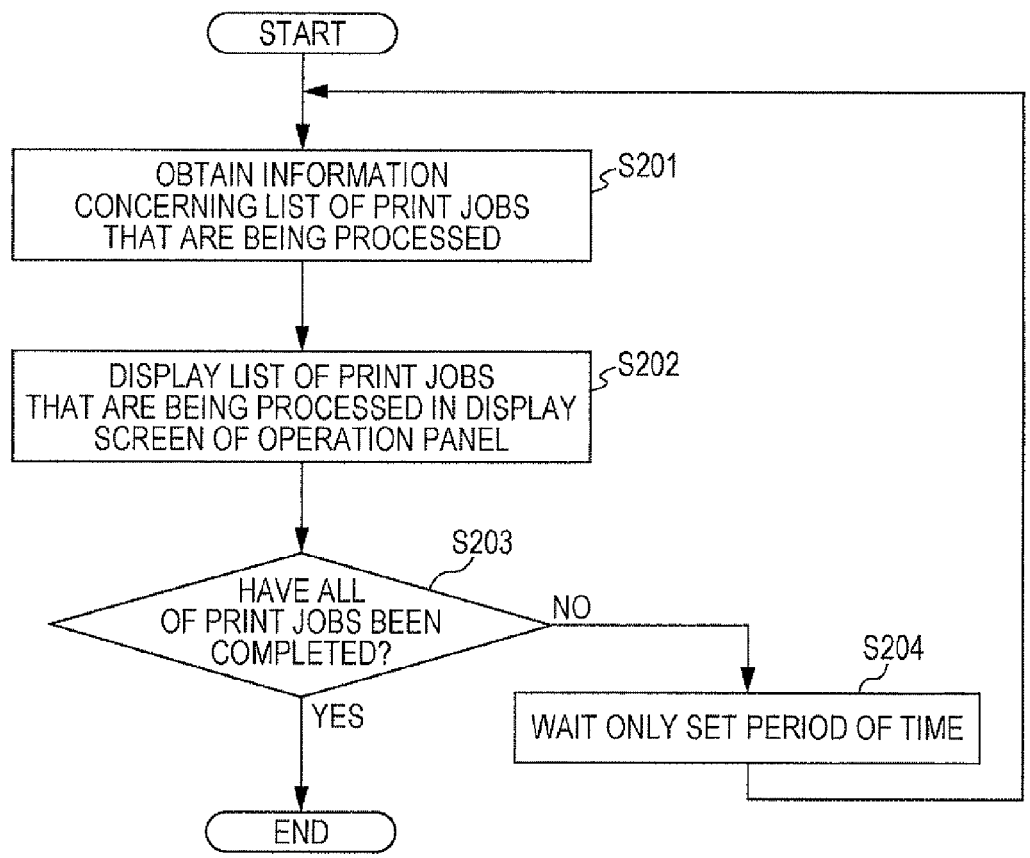
FIG. 6 is a flowchart for explaining an operation in the case where the display screen of the list of print jobs is performed in a polling mode that has been described in association with step S103 illustrated in FIG. 5.

Next, an operation in the case where display of the display screen of the list of print jobs is performed in the polling mode that has been described in association with step S103 illustrated in FIG. 5 will be described in detail with reference to FIG. 6.

The display controller 37 obtains information concerning the list of print jobs that are being processed from the job controller 35 (step S201), and the display controller 37 displays the list of print jobs that are being processed in the display screen of the operation panel 20 (step S202). Then, when all of the print jobs have not been completed (NO in step S203), the display controller 37 waits only a set period of time, e.g., only a period of time in the range from two seconds to four seconds (step S204), and the processes of steps S201 and S202 are repeatedly performed.

Then, when all of the print jobs have been completed (YES in step S203), the display controller 37 finishes the process.

Next, examples of the display screen of the list of print jobs displayed on the operation panel 20 in this manner will be described with reference to FIGS. 7A and 7B, 8, 9A and 9B, 10, and 11.

Figure 7A:
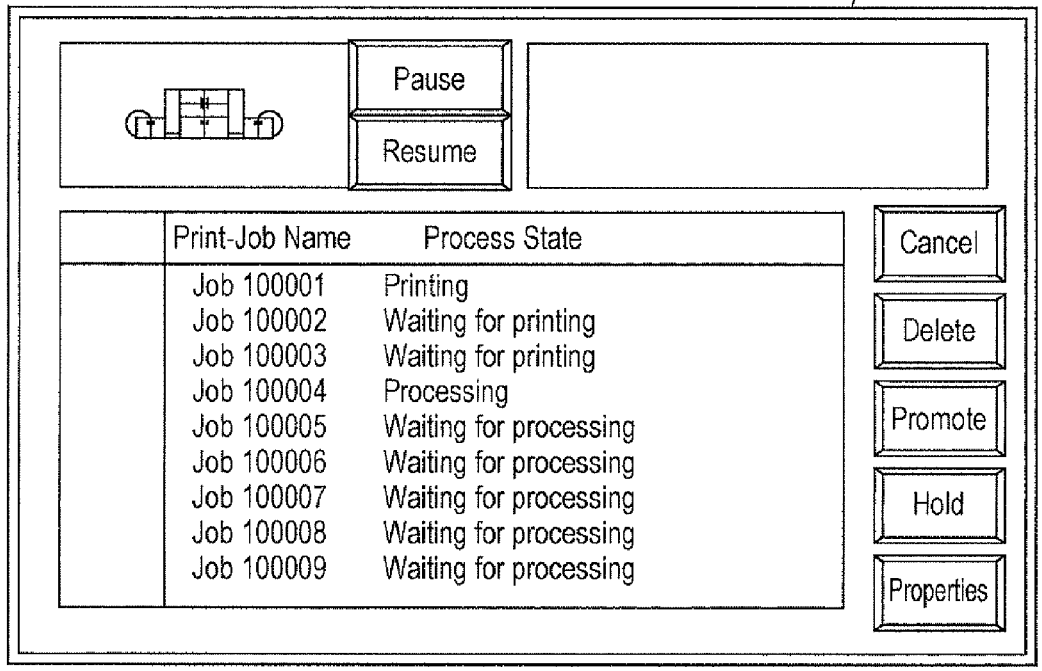
FIGS. 7A and 7B are diagrams illustrating examples of the case where display of the display screen of the list of print jobs is performed in a real-time mode.
Figure 7B:
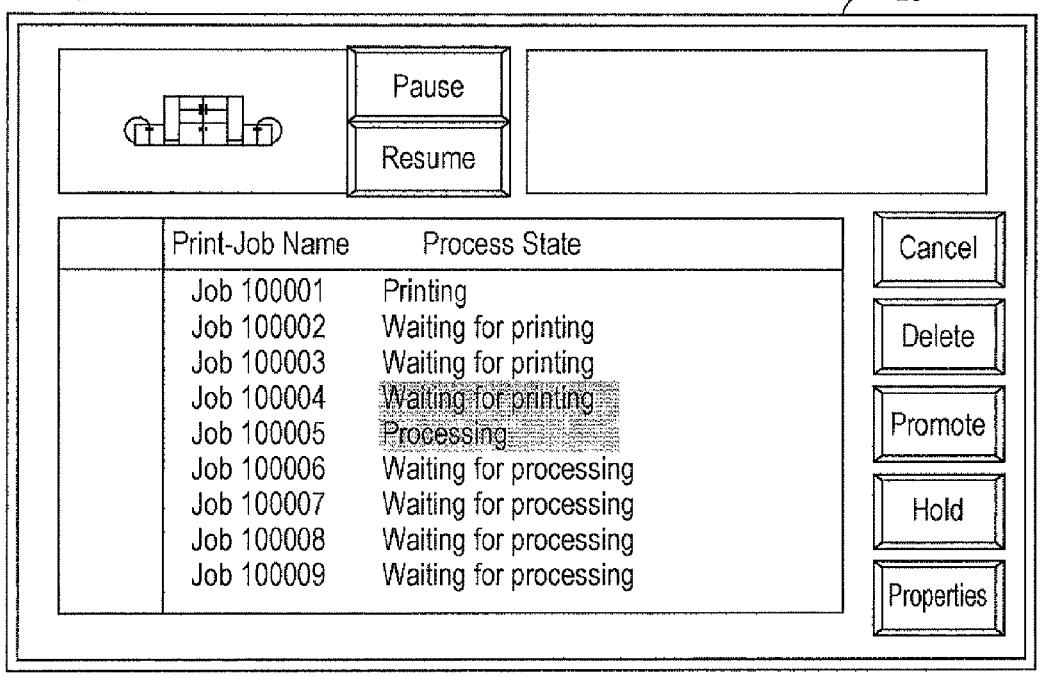

First, examples in the case where display of the display screen of the list of print jobs is performed in the real-time mode are illustrated in FIGS. 7A and 7B. In the real-time mode, when the process state of any one of the print jobs changes, the contents displayed in the display screen are updated. A case where display of the display screen of the list of print jobs illustrated in FIG. 7A is performed is supposed. In this case, when the process state of a print job of "job 100004" changes from the "Processing" state to the "Waiting for printing" state because a process of generating print data for the print job has finished, and the process state of a print job of "job 100005" changes from the "Waiting for processing" state to the "Processing" state because a process of generating print data for the print job has started, the contents displayed in the display screen of the list of print jobs are updated to the contents displayed in the display screen illustrated in FIG. 7B.

In the above-described display screen of the list of print jobs in the real-time mode, sequential changes in the process states of the print jobs are recognizable. However, print jobs for which print processes have been completed disappear one by one from the display screen of the list of print jobs. Accordingly, the contents displayed in the display screen of the list of print jobs scroll in accordance with the progress of the print processes. Consequently, in the case where the print processes of a continuous-form printer that is capable of performing high-speed printing with a print speed such as 2500 pages/minute are controlled, when the display screen of the list of print jobs is displayed in the real-time mode, the contents displayed in the display screen scroll with a speed at which the contents displayed in the display screen are not visually recognizable.

Figure 8:
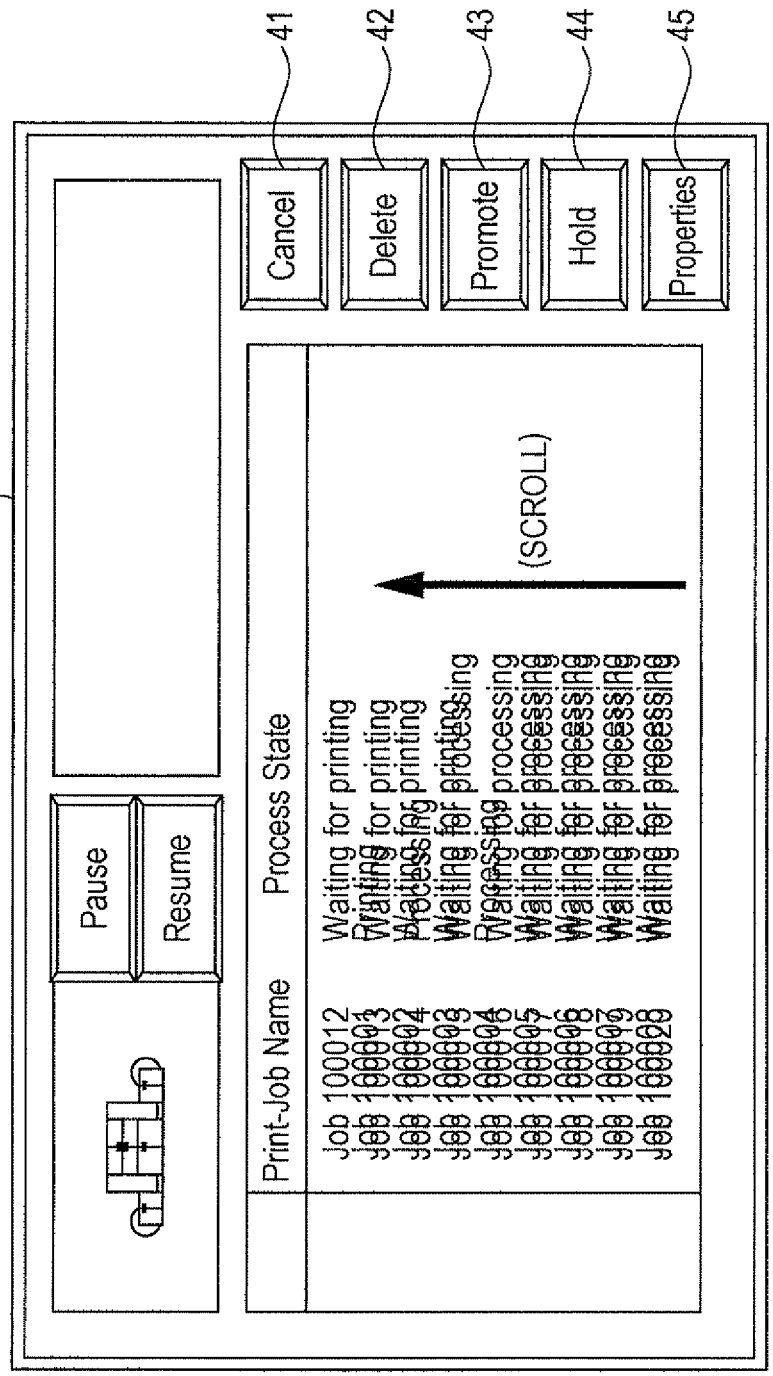
FIG. 8 is a diagram illustrating an example of the display screen in the case where the display screen of the list of print jobs is displayed in the real-time mode when a progress speed for print processes is high.

For example, in the case where print processes for multiple print jobs that each include one page are performed, when the print processes are performed by a high-speed continuous-form printer having a print speed of 2500 pages/minute ($\approx$42 pages/second), processes for forty or more print jobs are completed within one second. Thus, in such a case where the progress speed is high, when the display screen of the list of print jobs is displayed in the real-time mode, the contents displayed in the display screen are not visually recognizable as illustrated in FIG. 8.

Figure 9A:
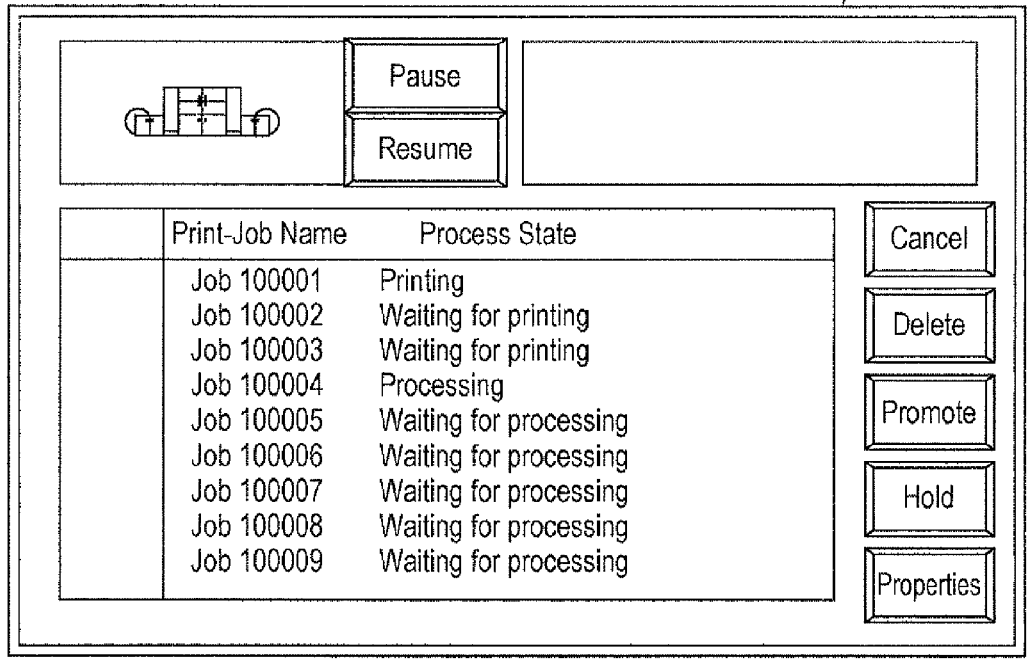
FIGS. 9A and 9B are diagrams illustrating examples of the case where display of the display screen of the list of print jobs is performed in the polling mode.
Figure 9B:
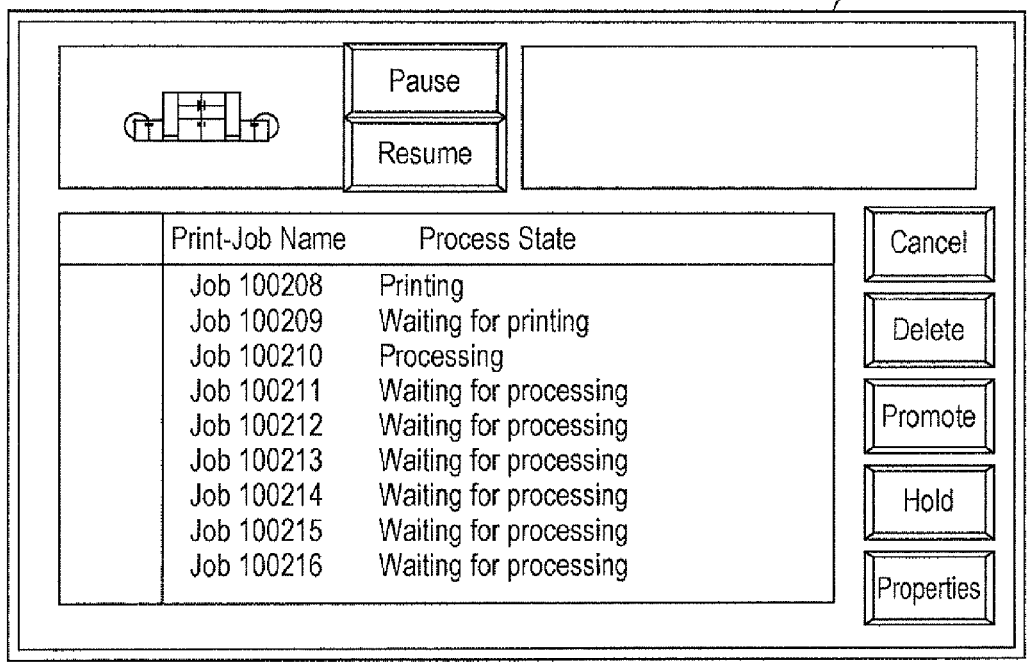

However, in such a case where the progress speed for print processes is high, the controller 30 included in the printing system according to the present exemplary embodiment performs display of the display screen of the list of print jobs in the polling mode as illustrated in FIGS. 9A and 9B. In the display screen of the list of print jobs in the polling mode, the contents displayed in the display screen are updated only at the set time intervals. Accordingly, for example, the contents displayed in the display screen illustrated in FIG. 9A are switched to the contents displayed in the display screen illustrated in FIG. 9B.

Figure 10:
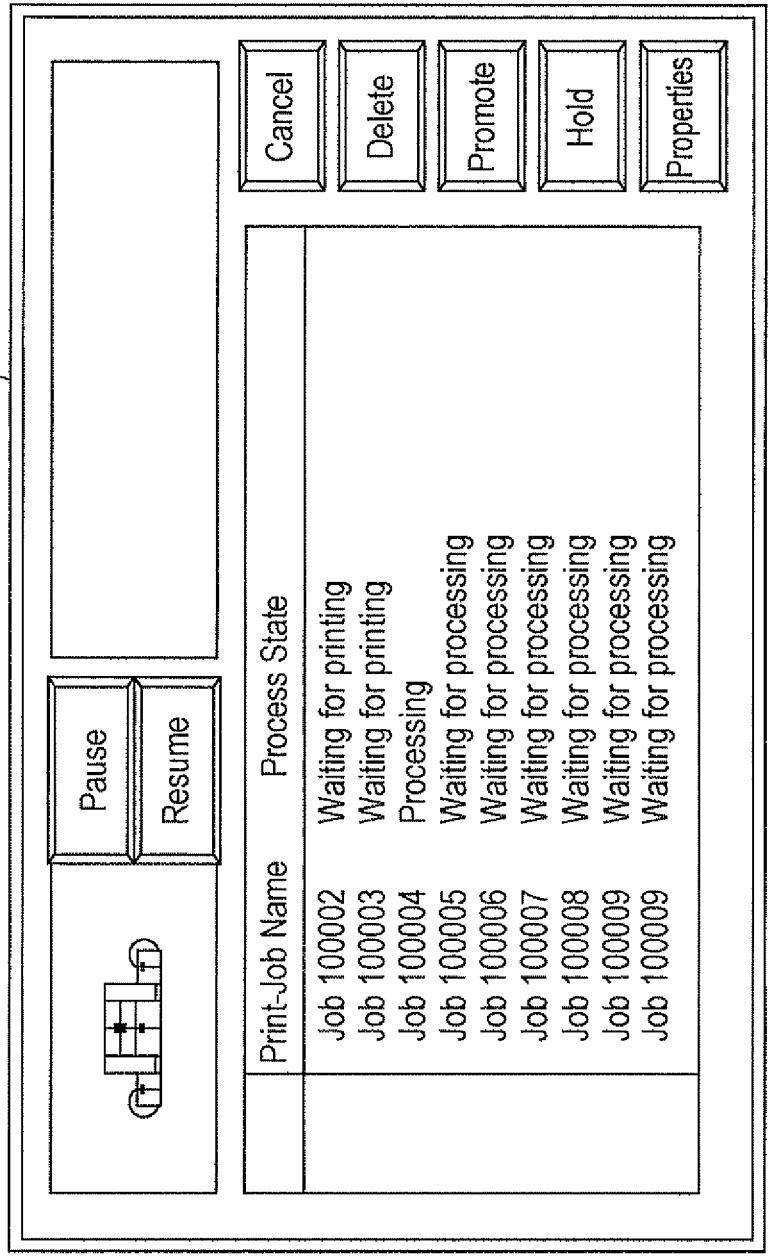
FIG. 10 is a diagram illustrating an example of the display screen in the case where, when display of the display screen of the list of print jobs is performed in the polling mode, print jobs whose process states are each a "Printing" state are not displayed in the display screen of the list of print jobs.

Note that an example of the display screen in the case where, when the display controller 37 performs control of displaying the display screen of the list of print jobs in the polling mode, the display controller 37 performs control of not displaying print jobs whose process states are each the "Printing" state in the display screen of the list of print jobs is illustrated in FIG. 10.

In the polling mode, the updated contents that are displayed in the display screen indicate process states that existed prior to the actual process states. Accordingly, even when the "Printing" state is displayed for a print job, it is highly probable that a print process for the print job has already been completed in reality. Thus, in the example of the display screen illustrated in FIG. 10, print jobs whose process states are each the "Printing" state are deleted from the display screen of the list of print jobs without being displayed.

Figure 11:
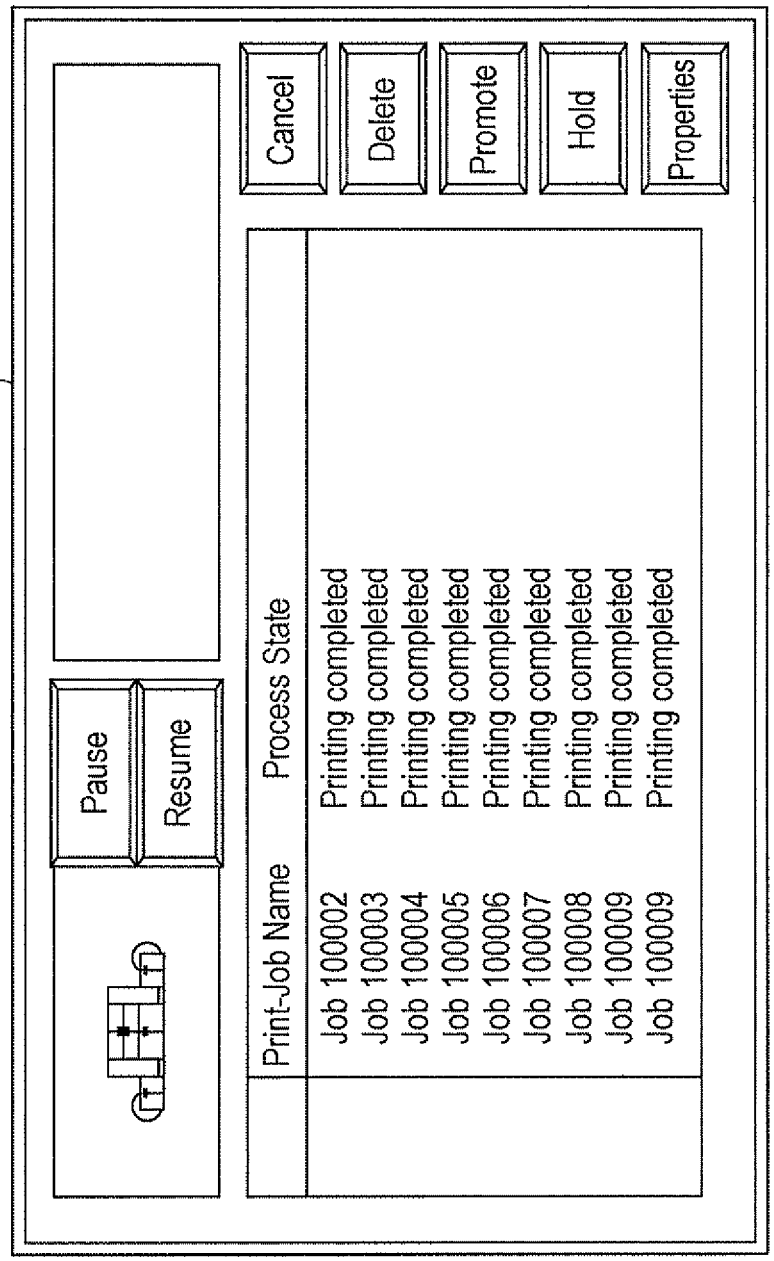
FIG. 11 is a diagram illustrating an example of the display screen in the case where, when display of the display screen of the list of print jobs is performed in the polling mode, the process states of the print jobs are displayed in a such a manner that the process states of all of the print jobs in the display screen of the list of print jobs are each assumed to be a "Printing completed" state.

Furthermore, an example of the display screen in the case where, when the display controller 37 performs control of displaying the display screen of the list of print jobs in the polling mode, the display controller 37 displays the process states of the print jobs in such a manner that the process states of all of the print jobs in the display screen of the list of print jobs are each assumed to be the "Printing completed" state is illustrated in FIG. 11.

Because of a reason similar to the reason described above, in the polling mode, the updated contents that are displayed in the display screen indicate process states that existed prior to the actual process states. Accordingly, even when the "Printing" state, the "Waiting for printing" state, the "Processing" state, or the "Waiting for processing" state is displayed for a print job, it is highly probable that a print process for the print job has already been completed in reality. Thus, in the example of the display screen illustrated in FIG. 11, the process states of the print jobs are displayed in such a manner that the process states of all of the print jobs are each assumed to be the "Printing completed" state.

Note that, even in the case where the display controller 37 performs such control, the display controller 37 may display the process states of the print jobs in such a manner that the process states of only a fixed number of print jobs starting with the first-listed print job are each assumed to be the "Printing completed" state, instead of in such a manner that the process states of all of the print jobs are each assumed to be the "Printing completed" state.

Moreover, a case is supposed, in which, while such display of the display screen of the list of print jobs is being performed, a certain error occurs in the printing apparatus 40 and, consequently, print processes for print jobs are halted. In this case, a situation may occur, in which, even when the process states of the print jobs are displayed in such a manner that the process states are each assumed to be the "Printing completed" state, the print processes have not been completed in reality. However, in this case, the progress speed for print processes decreases because the print processes have been halted. Accordingly, the display controller 37 switches the display screen of the list of print jobs from being displayed in the polling mode to being displayed in the real-time mode. Thus, the correct contents corresponding to the actual process states of the process jobs are eventually displayed in the display screen of the list of print jobs.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A print control apparatus comprising:
   an accepting unit that accepts a print request;
   a generating unit that generates, on the basis of a print request accepted by the accepting unit, print data for outputting an image onto printing paper;
   a transmission unit that transmits print data generated by the generating unit to a printing apparatus;
   a display that displays a display screen of a list of a plurality of print requests accepted by the accepting unit, together with process states of the individual print requests;
   a determination unit that determines whether or not a progress speed that is a speed with which processes based on the plurality of print requests are to be completed is equal to or higher than a set value; and
   a display controller that, when it is determined by the determination unit that the progress speed is lower than the set value, performs control of updating the display screen of the list of the print requests, which is displayed on the display, at first time intervals, and that, when it is determined by the determination unit that the progress speed is equal to or higher than the set value, performs control of updating the display screen of the list of the print requests, which is displayed on the display, at second time intervals which are longer than the first time intervals.

2. The print control apparatus according to claim 1, wherein control of updating the display screen of the list of the print requests, which is displayed on the display, at the first time intervals is control of immediately updating the display screen of the list of the print requests, which is displayed on the display, when the process state of any one of the print requests changes, and
   wherein control of updating the display screen of the list of the print requests, which is displayed on the display, at the second time intervals longer than the first time intervals is control of updating the display screen of the list of the print requests, which is displayed on the display, at set time intervals.

3. A print control apparatus comprising:
   an accepting unit that accepts a print request;
   a generating unit that generates, on the basis of a print request accepted by the accepting unit, print data for outputting an image onto printing paper;
   a transmission unit that transmits print data generated by the generating unit to a printing apparatus;
   a display that displays a display screen of a list of a plurality of print requests accepted by the accepting unit, together with process states of the individual print requests;
   a determination unit that determines whether or not a progress speed that is a speed with which processes based on the plurality of print requests are to be completed is equal to or higher than a set value; and
   a display controller that, when it is determined by the determination unit that the progress speed is equal to or higher than the set value, performs control of updating the display screen of the list of the print requests, which is displayed on the display, at set time intervals,
   wherein, in a case where the display controller performs control of updating the display screen of the list of the print requests, which is displayed on the display, at the set time intervals, the display controller performs control of not displaying a print request whose process state is a printing state in the display screen of the list of the print requests.

4. A print control apparatus comprising:
   an accepting unit that accepts a print request;
   a generating unit that generates, on the basis of a print request accepted by the accepting unit, print data for outputting an image onto printing paper;
   a transmission unit that transmits print data generated by the generating unit to a printing apparatus;
   a display that displays a display screen of a list of a plurality of print requests accepted by the accepting unit, together with process states of the individual print requests;
   a determination unit that determines whether or not a progress speed that is a speed with which processes based on the plurality of print requests are to be completed is equal to or higher than a set value; and
   a display controller that, when it is determined by the determination unit that the progress speed is equal to or higher than the set value, performs control of updating the display screen of the list of the print requests, which is displayed on the display, at set time intervals,
   wherein, in a case where the display controller performs control of updating the display screen of the list of the print requests, which is displayed on the display, at the set time intervals, the display controller performs control of displaying the process states of the print requests in such a manner that the process states of all of the print requests in the display screen of the list of the print requests are each assumed to be a printing-completed state.

5. An image forming system comprising:
   an accepting unit that accepts a print request;
   a generating unit that generates, on the basis of a print request accepted by the accepting unit, print data for outputting an image onto printing paper;
   a transmission unit that transmits print data generated by the generating unit;
   a display that displays a display screen of a list of a plurality of print requests accepted by the accepting unit, together with process states of the individual print requests;

a determination unit that determines whether or not a progress speed that is a speed with which processes based on the plurality of print requests are to be completed is equal to or higher than a set value;

a display controller that, when it is determined by the determination unit that the progress speed is lower than the set value, performs control of updating the display screen of the list of the print requests, which is displayed on the display, at first time intervals, and that, when it is determined by the determination unit that the progress speed is equal to or higher than the set value, performs control of updating the display screen of the list of the print requests, which is displayed on the display, at second time intervals which are longer than the first time intervals; and a printing apparatus that outputs, onto printing paper, an image based on print data transmitted by the transmission unit.

6. A non-transitory computer-readable medium storing a program causing a computer to execute a process, the process comprising:

generating, on the basis of an accepted print request, print data for outputting an image onto printing paper, and transmitting the print data to a printing apparatus;

displaying a display screen of a list of a plurality of accepted print requests together with process states of the individual print requests;

determining whether or not a progress speed that is a speed with which processes based on the plurality of accepted print requests are to be completed is equal to or higher than a set value; and performing, when it is determined that the progress speed is lower than the set value, control of updating the display screen of the list of the print requests, which is displayed, at first time intervals, and performing, when it is determined that the progress speed is equal to or higher than the set value, control of updating the display screen of the list of the print requests, which is displayed, at second time intervals which are longer than the first time intervals.

* * * * *